Sept. 28, 1971     A. H. LINDQUIST     3,608,172
METHOD AND DEVICE FOR THE MANUFACTURE OF
FRANCIS TURBINE RUNNERS
Filed Jan. 31, 1969     2 Sheets-Sheet 1

INVENTOR
ARNE HERMAN LINDQUIST
By Hane and Baxley
ATTORNEYS

Sept. 28, 1971  A. H. LINDQUIST  3,608,172
METHOD AND DEVICE FOR THE MANUFACTURE OF
FRANCIS TURBINE RUNNERS
Filed Jan. 31, 1969  2 Sheets-Sheet 2

INVENTOR
ARNE HERMAN LINDQUIST
By Hane and Baxley
ATTORNEYS

United States Patent Office 3,608,172
Patented Sept. 28, 1971

3,608,172
METHOD AND DEVICE FOR THE MANUFACTURE OF FRANCIS TURBINE RUNNERS
Arne Herman Lindquist, Trollhattan, Sweden, assignor to Aktiebolaget Nohab, Trollhattan, Sweden
Filed Jan. 31, 1969, Ser. No. 795,545
Claims priority, application Sweden, Feb. 5, 1968, 1,479/68
Int. Cl. B21k *3/04;* B23p *15/02, 15/04*
U.S. Cl. 29—156.8R                                  12 Claims

ABSTRACT OF THE DISCLOSURE

A re-finished and annealed Francis-type runner is finished by first machining a guide structure and surface on the hub of the runner to selected final dimensions. Such machining is effected by mounting the center shaft of a machine tool so that it is coaxial with the hub and the rim of the runner and so that the finishing tool carried by the machine tool is in coacting relationship with the guide structure and surface to be machined for finishing. This machine tool is then removed and a second machine tool is mounted on the guide structure and surface finished with the first machine tool. Correct location of the second machine tool is effected by utilizing the finished areas of the structure and the surface as reference areas. The second machine tool also mounts a finishing tool by means of which further guide structures and surfaces on the hub and the rim of the runner are machined to selected final dimensions whereupon the second machine tool is also removed.

---

Figure 1:
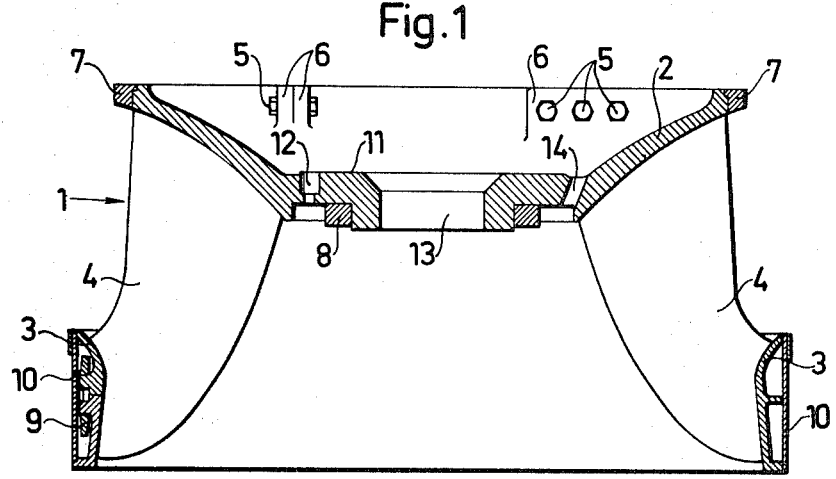

The present invention is concerned with a method of manufacturing Francis-type runners for water-turbines, pump-turbines and pumps, and an apparatus for carrying out the method. The conventional method of manufacturing such runners comprises manufacturing and working the hub and rim portions as an integral unit, whereafter the blades are mounted between said hub and rim portions. The complete runner is then annealed and certain surfaces and guide-structures are finally machined in a lathe. The finished runner is then transported to the place where it is to be installed.

In the case of large hydraulic-turbines, pump-turbines and pumps which develop a power higher than about 200,000 horse power, the runner is so large that it cannot be transported in one piece. Consequently the runner must be transported in separate parts to the installation site, e.g. a power station. Moreover, the runner is so large and heavy that it cannot be turned in available lathes. The weight of such a runner may be much higher than 100 tons.

One object of the present invention is to make it possible to manufacture a Francis-type runner of these large dimensions in several parts and to assemble and finally adjust said parts at the installation site. A further object of the invention is to enable whole runners to be manufactured entirely at the installation site, without access to large working machines which a plant can offer. These objects are fulfilled by the method according to the invention, which is mainly characterized in that a hub and a rim, each made in one piece or comprising a number of parts and machined to almost finished dimensions, is assembled in a known manner with blades to form a runner, the guide structure of the hub and the abutment surface for the machine axle of which are machined subsequent to the annealing of the runner, by a first tool including a shaft which is centered in the center of the runner, whereafter a second tool is placed on said surface and said guide structure and by means of which surfaces and guide structures at the circumferences of the hub and rim are machined using as reference point from the first mentioned surface and guide structure; and by the apparatus according to the invention, which includes a first tool which comprises a vertical standard supported on a solid surface and which is adapted to be aligned with the center axis of a runner to be machined, the standard extending up from the hub of the runner and being provided with arms arranged to rotate about said standard. At least one of the arms carries grinding devices, milling devices or the like for machining surfaces or guide structures on the hub and at least one arm supports indicator gauges or the like for sensing circumferences on the runner for adjusting the standard in the center of the runner for which purpose the standard is also provided with radially adjustable supports arranged to cooperate with the walls of the centre bore of the hub. A second tool comprises a vertical standard, which is adapted to be supported on the surfaces and guide structures of the hub which were machined with the first tool, and which in other respects is aligned in the same manner as the first tool. The second tool is provided with at least one arm mounted for rotation around said standard, the arm being provided with grinding devices, milling devices or the like for machining surfaces or guide structures on the runner.

Figure 2:
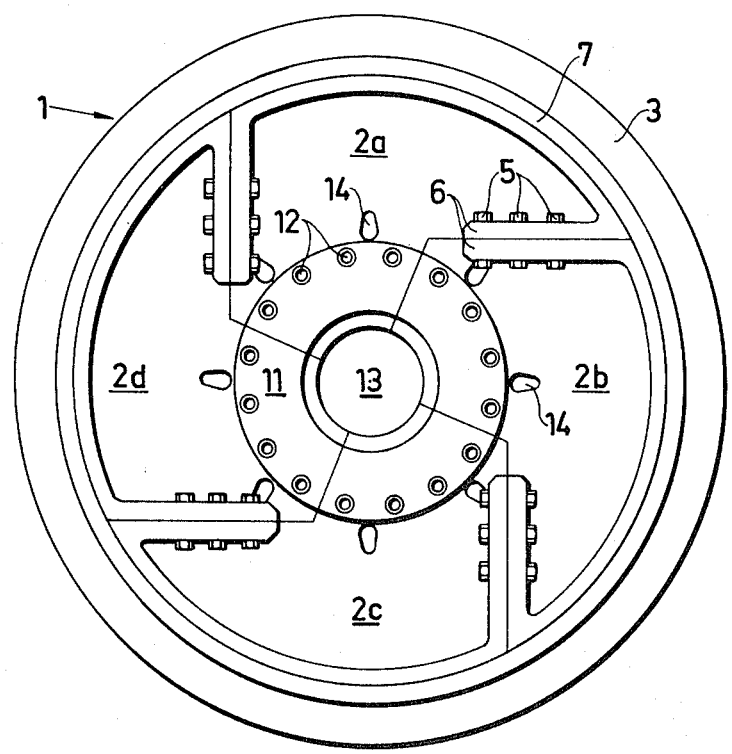
Figure 3:
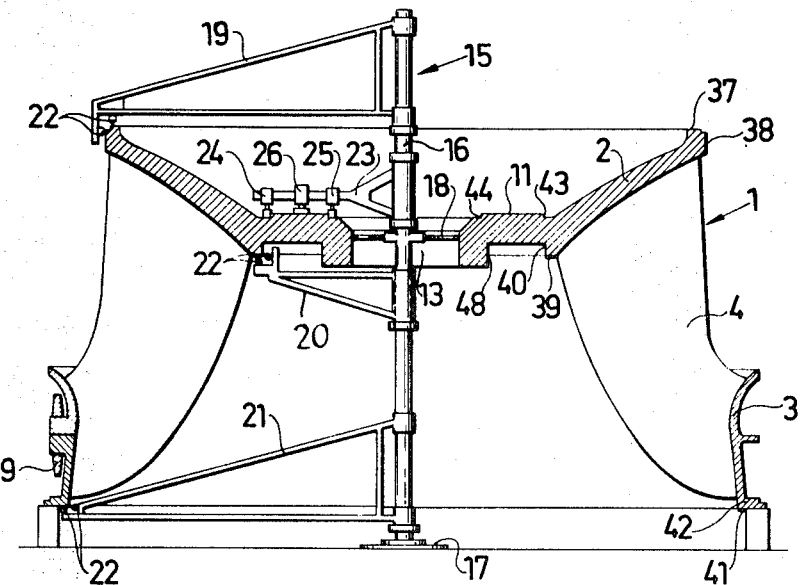
Figure 4:
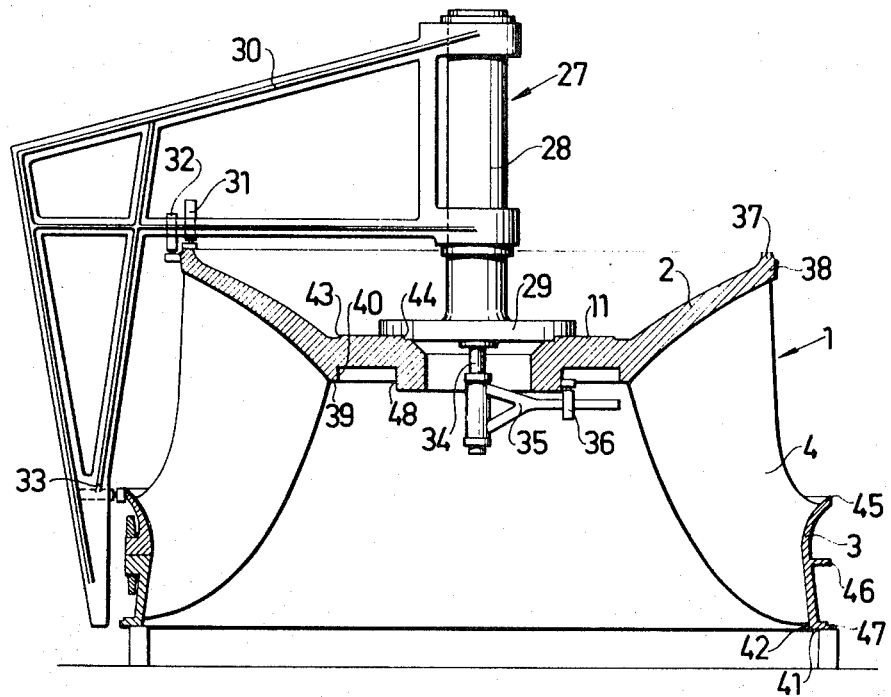

The invention will now be described with reference to the accompanying drawings, in which FIG. 1 is an elevational section of a Francis-type runner, manufactured by the method of the invention, and in which for the sake of clarity all the blades located outside the section have been omitted, FIG. 2 is a horizonal view of the runner shown in FIG. 1, and FIGS. 3 and 4 show an elevational section the runner while being worked with two separate tools, which form parts of the apparatus according to the invention.

In FIGS. 1 and 2 there is illustrated a large Francis-type runner 1 of a water-turbine, pump-turbine or pump. The runner comprises a hub 2, a rim 3 and blades 4 mounted therebetween. The hub comprises four parts 2a–2d, joined together by means of bolts 5 in flanges 6 projecting from said parts, and by means of shrink-rings 7 and 8. The rim 3 comprises four parts, corresponding to the hub parts 2a–2d and held together by bolts (not shown) and shrink-rings 9. An outer plate 10 is peripherally mounted on rim 3. When assembling the runner, the runner shaft or axle (not shown) is bolted or screwed securely to the surface 11 of the hub in a conventional manner, holes 12 being arranged for this purpose. The machine axle is guided by a guide structure 44 at the center bore 13 of the hub. The hub is also provided with a drainage hole 14.

FIGS. 3 and 4 illustrate an apparatus according to the invention, for carrying out the method according to the invention. FIG. 3 shows a first tool 15 for machining certain surfaces and guides on the runner. The tool includes a standard 16 which rests on a support base by means of a foot 17 and extends up through the center bore 13 in the hub of runner 1 also resting on the support base. The standard 16 abuts against the wall of the bore 13 through the intermediary of a radially adjustable support 18. Three sensing arms 19, 20 and 21 are mounted for rotation on the standard 16. The arms are provided at the ends thereof with indicator-gauges 22 for sensing separate surfaces of the runner. Also mounted for rotation on the standard is a circumferentially driven machining arm 23. The arm 23 carries two grinding devices or milling devices or the like, 24 and 25, which are capable of being adjusted radially on the arm. Inbetween said devices 24 and 25, the arm supports a grinding device, milling device or the like 26, which has a radial, reciprocating working movement.

FIG. 4 illustrates a second tool 27 arranged on the same runner as that shown in FIG. 3. The tool 27 includes a standard 28 having a support plate 29 which rests on the surface 11 of the hub. Mounted for rotation on the standard is a rotary machining arm 30, which is motor driven. The arm 30 supports two adjustable grinding devices, milling devices or the like 31 and 32 for working surfaces on the upper outer edge surface of the hub, and an adjustable grinding device, milling device or the like 33 for machining the peripheries of the rim. Projecting downwardly from the standard 28 is a pin 34, on which is rotatably mounted a working arm 35, provided with an adjustable grinding device, milling device or the like 36.

Manufacture of a runner in accordance with the invention is effected in the following manner. The parts 2a–2d of the hub are assembled by means of the bolts 5 and machined almost completely in a lathe. The four parts of the rim 3 are assembled by means of bolts (not shown) and shrink-rings 9 and then machined close to the desired dimensions. The machined blades are now assembled in-between the hub and the rim in a known manner. The assembled runner is then annealed.

Subsequent to the annealing process, the first step is to place the tool 15 in the center of the runner. The standard 16 is centered by means of the indicator gauges 22 on the arms 19, 20 and 21. The gauges sense the upper defining surface 37 of the hub and the outer circumference 38, the outer, lower defining surface 39 of the hub and the associated inner circumference 40, and the lower defining surface 41 of the rim and the associated inner circumference 42. When the tool is correctly aligned, the guide structures 43 and 44 and the surface 11 of the hub are machined by means of the devices 24, 25 and 26 arranged on the arm 23.

The tool 27 is then placed on the machined surface 11 and guided centrally in the guide structure 44. The surface 37 and the circumference 38 are then machined by the devices 31 and 32 while the circumferences 45, 46 and 47 of the rim are machined with the device 33. The guide structure 48 for shrink-ring 8 is machined by the device 36 on the arm 35. The runner is now ready for use.

Prior to being dispatched to the installation site, the runner is dismantled into four parts, each part including a part of the hub, a part of the rim and intermediate blades. The runner is assembled on arrival at the installation site, whereafter the shrink-rings 7 and 8 and the outer plate 10 are assembled; the runner is then complete as shown in FIGS. 1 and 2. The tool 27 is remounted and the outer diameters checked and adjusted if necessary.

The invention is not restricted to divided runners, but may also be applied to whole runners which are assembled direct at the installation site without access to large lathes or the like.

I claim:

1. A method of finishing a pre-finished and annealed Francis-type runner composed of a hub including a guide structure and guide surface for seating and securing thereon a runner shaft, a rim and runner blades extending between the hub and the rim secured thereto, said method comprising the steps of:
   mounting a first machine tool including a rotary finishing tool in coacting relationship with said guide structure and abutment surface of the hub;
   then machining said guide structure and surface on the hub to selected final dimensions;
   then removing the first machine tool;
   then mounting a second machine tool including a finishing tool upon said finished guide structure and surface, said guide structure and surface constituting reference areas for locating the second machine tool;
   then machining peripheral guide structures and surfaces at the hub and the rim to selected final dimensions; and
   finally removing the second machine tool.

2. The method according to claim 1 and also comprising the steps of: providing as first machine tool a machine tool having an upright center shaft and an arm radially extending from said shaft rotatable about the center axis thereof and mounting the finishing tool, and mounting said center shaft coaxially with the hub and the rim.

3. The method according to claim 1 and also comprising the steps of: circumferentially dividing the hub and the rim into several sections so that each hub section and rim section are joined to one of said runner blades, fitting said hub and rim sections to each other in positions relative one to another forming the runner, securing the fitted hub and rim sections one to another by shinking rings upon the hub sections and the rim sections respectively.

4. The method according to claim 3 and fitting a further ring about each of said rings shrunk upon the sections.

5. The method according to claim 1 and also comprising the steps of: providing sensing means on the first machine tool, sensing the locations of selected peripheral surfaces on the hub and the rim with reefrence to the center axis of the hub and the rim, and locating said first machine tool coaxially with said center axis in accordance with indications of said sensing means.

6. A device for finishing a pre-finished and annealed Francis-type runner composed of a hub and a rim joined by runner blades, the hub and the rim including guide structures and guide surfaces to be finished, said device comprising in combination:
   a first machine tool including an upright center shaft adapted to be placed with one end upon a stationary support base, at least one arm radially extending from the shaft rotatable about the center axis thereof and mounting a finishing tool for machining a guide structure and a guide surface of the hub to selected final dimensions, and at least one other arm radially extending from said shaft rotatable about the same and mounting sensing means for sensing the locations of selected peripheral surfaces on the hub and the rim with reference to the center axis of the shaft for locating the latter coaxially with said center axis; and
   a second machine tool including an upright center shaft, mounting means for mounting said shaft on said finished guide structure and guide surface, one arm radially extending from said center shaft rotatable about the same and mounting a finishing tool for machining other guide structures and guide surfaces on the hubs and the rim to selected final dimensions.

7. The device according to claim 6 wherein the finishing tool of said first machine tool is disposed to machine a guide structure and guide surface on one face side of the hub to final dimensions, said mounting means of the second machine tool being arranged to secure the center shaft to said finished guide structure and guide surface on said one face side.

8. The device according to claim 6 wherein lengthwise adjustable locating pins radially extend from the center shaft of the first machine tool for locking said shaft in its position coaxial with the hub and the rim as sensed by the sensing means of the first machine tool.

9. The device according to claim 6 wherein said first machine tool comprises two further arms radially extending from the center shaft of said machine tool rotatable about the center axis of the shaft and mounting second and third sensing means respectively, the first mentioned of said sensing means being disposed to sense portions of the outer upper peripheral surfaces of the hub and portions of the upper defining surface thereof, the second sensing means being disposed to sense portions of the outer lower defining surface, and of the adjacent peripheral surfaces of the hub, and the third sensing means being disposed to sense portions of the lower outer defining surfaces and of the adjacent inner peripheral surface of the rim.

10. The device according to claim 6 wherein a second arm radially extends from the center shaft of the second machine tool rotatable about the axis of said shaft and mounting a second finishing tool, one of the finishing tools of the second machine tool being arranged to machine portions of outer peripheral surfaces and portions of lower defining surfaces of the hub and also portions of outer peripheral surfaces of the rim to final dimensions, and the other of said finishing tools of the second machine tool being disposed to machine portions of an inner peripheral guide surface of the hub for fitting a shrink-ring thereupon.

11. The device according to claim 10 wherein said mounting means comprise a plate mounted on one side of the center shaft of the second machine tool normal to said shaft, said plate being arranged to be secured to the guide structure and guide surface after finishing thereof by the finishing tool of the first machine tool.

12. The device according to claim 11 wherein said center shaft mounted on one side of the plate is extended on the other side thereof, said shaft extension mounting the radial arm supporting the finishing tool of the second machine tool for machining said portions of said inner peripheral guide surface of the hub to final dimensions.

References Cited

UNITED STATES PATENTS

| | | | |
|---|---|---|---|
| 145,103 | 12/1873 | McDonald | 82—4 |
| 1,714,103 | 5/1929 | Parks | 51—245 |
| 1,832,923 | 11/1931 | Turner | 82—4 |
| 1,917,037 | 7/1933 | Jessop et al. | 29—156.8 |
| 1,973,597 | 9/1934 | Anderson | 82—4 |
| 2,541,412 | 2/1951 | Frost | 51—245 |
| 2,553,570 | 5/1951 | Flynn | 82—4 |

FOREIGN PATENTS

| | | | |
|---|---|---|---|
| 360,669 | 4/1962 | Sweden | 29—156.8 |
| 674,399 | 6/1952 | Great Britain | 29—156.8 |

JOHN F. CAMPBELL, Primary Examiner

V. A. D. PALMA, Assistant Examiner

U.S. Cl. X.R.

29—558; 51—241, 245; 82—4, 34